United States Patent
Zhao et al.

(10) Patent No.: US 7,623,676 B2
(45) Date of Patent: Nov. 24, 2009

(54) METHOD AND APPARATUS FOR TRACKING OBJECTS OVER A WIDE AREA USING A NETWORK OF STEREO SENSORS

(75) Inventors: Tao Zhao, Plainsboro, NJ (US); Manoj Aggarwal, Lawrenceville, NJ (US); Rakesh Kumar, West Windsor, NJ (US); Harpreet Sawhney, West Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 653 days.

(21) Appl. No.: 11/314,954

(22) Filed: Dec. 21, 2005

(65) Prior Publication Data

US 2008/0101652 A1 May 1, 2008

Related U.S. Application Data

(60) Provisional application No. 60/638,048, filed on Dec. 21, 2004.

(51) Int. Cl.
*G06K 9/00* (2006.01)
*G06K 9/32* (2006.01)

(52) U.S. Cl. ............... 382/103; 382/128; 382/154; 382/203; 382/294; 382/287; 382/118; 382/159; 382/224; 382/217; 382/293; 348/580; 708/442

(58) Field of Classification Search ............ 382/103, 382/190, 128, 154, 203, 294, 287, 293, 217, 382/225; 348/169, 580; 708/442

See application file for complete search history.

(56) References Cited

U.S. PATENT DOCUMENTS

| | | | | |
|---|---|---|---|---|
| 6,993,158 | B2 * | 1/2006 | Cho et al. | 382/103 |
| 7,095,878 | B1 * | 8/2006 | Taylor et al. | 382/118 |
| 7,149,838 | B2 * | 12/2006 | Ervin | 710/306 |
| 7,292,737 | B2 * | 11/2007 | Zhou et al. | 382/294 |
| 7,450,736 | B2 * | 11/2008 | Yang et al. | 382/103 |
| 7,463,754 | B2 * | 12/2008 | Yang et al. | 382/103 |
| 2006/0028552 | A1 * | 2/2006 | Aggarwal et al. | 348/169 |

OTHER PUBLICATIONS

Person Counting Using Stereo, IEEE 2000.*
Integrated person tracking using stereo, color, and pattern detection., Darrell et al, 1998.*
Object Tracking with Bayesian Estimation of Dynamic Layer Representation, Kumar et al, Jan. 2002.*

(Continued)

*Primary Examiner*—Daniel G Mariam
*Assistant Examiner*—Nancy Bitar
(74) *Attorney, Agent, or Firm*—Lowenstein Sandler PC

(57) ABSTRACT

A method and/or system for tracking objects, such as humans, over a wide area (that is, over an area that is delineated by a large spatial domain and/or a long-duration temporal domain) is provided. Such tracking is facilitated by processing, in real-time, near real-time or otherwise contemporaneous with receiving, images captured by each of a plurality or network of slightly overlapping stereo sensors, such as stereo cameras. The method includes and the apparatus is adapted for obtaining a plurality of local-track segments, wherein the plurality of local-track segments correspond to an object captured in images taken by a respective plurality of stereo sensors; and combining the local-track segments to form a global track.

10 Claims, 11 Drawing Sheets

OTHER PUBLICATIONS

D. Comaniciu and P. Meer, "Mean Shift: A Robust Approach Toward Feature Space Analysis," *IEEE Trans. PAMI*, 24(5), 2002, pp. 603-619.

T. Darrell, G. Gordon, M. Harville, and J. Woodfill, "Integrated Person Tracking Using Stereo, Color, and Pattern Detection," *Int'l J. Computer Vision*, 37(2), Jun. 2000, pp. 175-185.

S. Haritaoglu, D. Harwood and L. S. Davis, "W4: Real-Time Surveillance of People and Their Activities," *IEEE Trans. PAMI*, 22(8), 2000, pp. 809-830.

M. Isard and J. MacCormick, "BraMBLe: A Bayesian Multiple-Blob Tracker," *Proc. ICCV*, 2001.

O. Javed, Z. Rasheed, K. Shafique and M. Shah, "Tracking Across Multiple Cameras With Disjoint Views," *Proc. ICCV*, 2003, pp. 1-6.

S. Khan and M. Shah, "Consistent Labeling of Tracked Objects in Multiple Cameras with Overlapping Fields of View," *IEEE Trans. on PAMI*, 25(10), 2003, pp. 1-15.

A. Mittal and L.S. Davis, "M2Tracker: A Multi-View Approach to Segmenting and Tracking People in a Cluttered Scene," *Int'l J. Computer Vision*, 51(3), 2003.

H. Pasula, S. Russell, M. Ostland and Y. Ritov, "Tracking Many Objects with Many Sensors," *Proc. IJCAI*, 1999.

A. Shashua and N. Navab, "Relative Affine Structure: Canonical Model for 3D From 20 Geometry and Applications," *IEEE Trans. PAMI*, 18(9), 1996.

T. Zhao and R. Nevatia, "Tracking Multiple Humans in Complex Environment," *Proc. IEEE CVPR*, 2004, pp. 1208-1221.

\* cited by examiner (a) two overlapping tracks (b) two non-overlapping tracks

(a) seq.1 on site 1
(b) seq.2 on site 1
(c) seq.3 on site 2

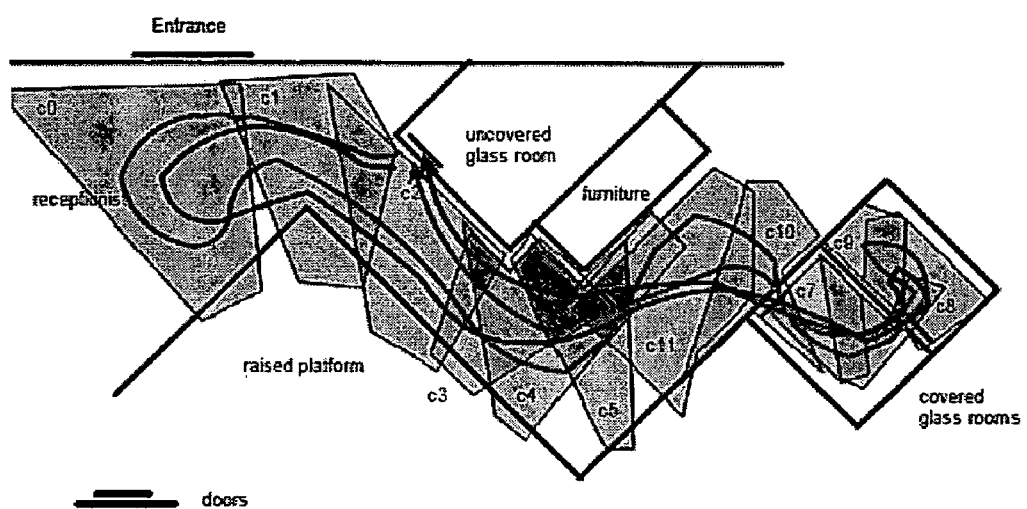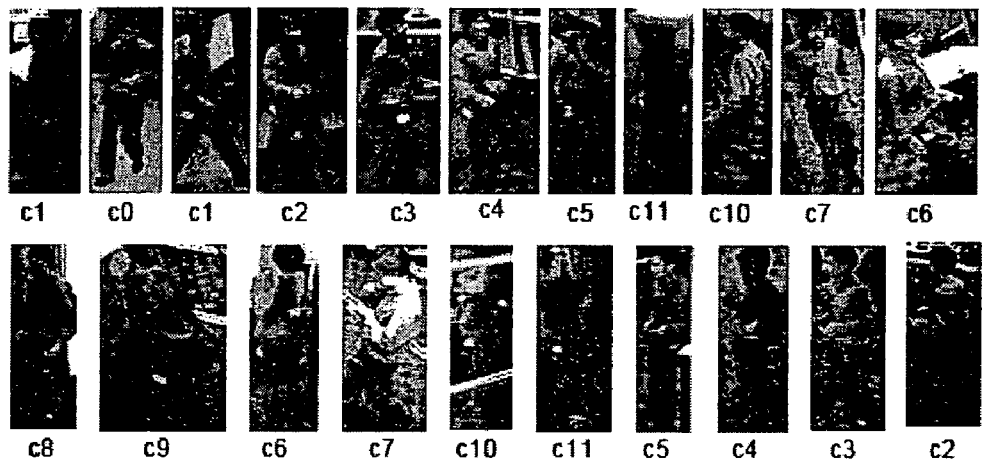
FIG. 11

METHOD AND APPARATUS FOR TRACKING OBJECTS OVER A WIDE AREA USING A NETWORK OF STEREO SENSORS

CROSS-REFERENCE TO RELATED APPLICATIONS

This application claims benefit of U.S. provisional patent application Ser. No. 60/638,048, filed Dec. 21, 2004, which is herein incorporated by reference.

GOVERNMENT RIGHTS IN THIS INVENTION

This invention was made with U.S. government support under contract number National Geo Agency NMA401-02-9-2001-023. The U.S. government has certain rights in this invention.

BACKGROUND

1. Field

The following relates to computer vision, and more particularly, to a method and apparatus for tracking movable objects using a plurality of communicatively-coupled stereo sensors.

2. Related Art

Currently, the field of computer vision is undergoing an explosion in research and development with respect to being able detect and track moving objects using images captured by a plurality or "network" of image sensors. Being able to detect and track the movable objects from images captured by the network image sensors beneficially provides a platform or mechanism upon which many important applications, including visual surveillance, intelligent living environment, human behavior analysis, etc., can be conceived, designed, constructed, developed or otherwise built.

Being networked together, the network of image sensors may be configured to have a collective field of view ("CFOV") that covers a wide area (that is, a field of view that covers a large spatial and/or a long duration temporal domain). As such, the images of the moveable objects captured by the network of image sensors provide the ability to track the movable objects across such wide area. The CFOV provided by the network of image sensors is potentially much more powerful than a field of view of a single image sensor ("SFOV"), which tends to be narrower than the CFOV or, if the same, then images captured by the single image sensor have resolutions much lower than images captured in the CFOV. Accordingly, the SFOV may detrimentally prevent the single image sensor from detecting and/or tracking objects as they undergo many interesting events across the wide area.

On the other hand, the CFOV allows the network of image sensors to provide images for continuous or, conversely, intermittent tracking of the movable objects, such as humans of vehicles, across the wide area. In turn, the tracking of the movable objects by the network of image sensors may provide the ability to determine and maintain identities of the movable objects throughout the wide area.

Tracking objects using "blobs" ("blob tracking") is a popular low-cost approach for tracking the movable objects using a series of sequential images ("frames"). Blob tracking of a given one of the movable objects, at its most basic level, entails (i) extracting from each of the frames blobs that are theoretically representative of each of the movable objects, and (ii) associating the blobs in a first frame to a second frame, and so on. Blob tracking, however, is not a viable tracking mechanism because proximities between the blobs for the multiple movable objects and occlusions tend to merge the blobs into a single blob. As such, the blob tracking lacks the ability to distinguish one of the movable objects from another, and as such, becomes untrustworthy.

Thus, there is a need in the art for a system and method for tracking moveable objects over a wide area, where the tracking is capable and trustworthy of distinguishing one of the moveable objects from another.

SUMMARY

The examples disclosed herein are directed to a method and/or system for tracking objects, such as humans, over a wide area (that is, over an area that is delineated by a large spatial domain and/or a long-duration temporal domain). Such tracking is facilitated by processing, in real-time, near real-time or otherwise contemporaneous with receiving, images captured by each of a plurality or network of slightly overlapping stereo sensors, such as stereo cameras.

The method includes and the apparatus is adapted for obtaining a plurality of local-track segments, wherein the plurality of local-track segments correspond to an object captured in images taken by a respective plurality of stereo sensors; and combining the local-track segments to form a global track. The method may further include and the apparatus is further adapted for generating from each of the images the local-track segments.

In another aspect, the method includes and the apparatus is adapted for tracking multiple objects over the wide area. To facilitate this, the method includes and the apparatus is adapted for obtaining first and second sets of local-track segments, wherein the first and second sets of local-track segments correspond to first and second objects captured in images taken by a respective plurality of stereo sensors; and combining first and second sets of the local-track segments to form first and second global tracks. The method further includes and the apparatus is further adapted for generating from each of the images the first and second sets of local-track segments.

BRIEF DESCRIPTION OF THE DRAWINGS

So that the manner in which the above recited features are attained and can be understood in detail, a more detailed description, which is briefly summarized above, is described below with reference to the Figures illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements: wherein:

FIGS. 10A-10C are images illustrating respective result sequences from single-sensor tracking for a given monitored area; and FIG. 11 is a block diagram illustrating a multiple sensor fusion result for a given monitored area.

DETAILED DESCRIPTION

Overview

The invention is directed to a method and/or system for tracking objects, such as humans, over a wide area (that is, over an area that is delineated by a large spatial domain and/or a long-duration temporal domain). Such tracking is facilitated by processing, in real-time, near real-time or otherwise contemporaneous with receiving, images captured by each of a plurality or network of slightly overlapping stereo sensors, such as stereo cameras. In contrast to monocular sensors, which capture images in only two dimensions ("2D"), the stereo sensors capture images within their field of view in three dimensions ("3D"). That is, each of the images provided by the stereo sensors has depth information along with information for the other two dimensions.

The depth information may be advantageously used to minimize processing or maximize the efficiency of the processing of the images for (i) segmenting the objects captured in the images, and/or (ii) tracking of the segmented objects. As such, the stereo sensors become particularly useful when the objects to be segmented and tracked are occluded in the wide area by a number of other objects.

The processing of the images may be performed using a tracking module, and a multi-sensor-fusion module. The tracking module, which may be embodied as a single module or, conversely, a plurality of modules, may obtain from each of the stereo sensors at least one of the images. For each of these images, the tracking module may detect one or more the objects ("detected objects") captured in such image. The tracking module, in turn, may generate a local-track segment for each of the detected objects. Thereafter, the multi-sensor-fusion module may combine each of the local-track segments for each of the detected objects with one or more space and/or time (space/time) constraints to form contiguous or, alternatively, concatenated, but segmented tracks (referred to herein collectively as a "global tracks").

The resolved global tracks may be stored in a database for future retrieval, viewing and processing. A visualization tool and an event query engine for further processing the global tracks may be tied to the database to retrieve the stored global tracks.

This process of generating local-track segments for each of the detected objects and combining the local-track segments into the global tracks may be employed for tracking multiple objects, which may move as a group, in a cluttered environment. For instance, the process may be used to track a plurality of humans moving about in an office area.

Example Architecture

Figure 1:
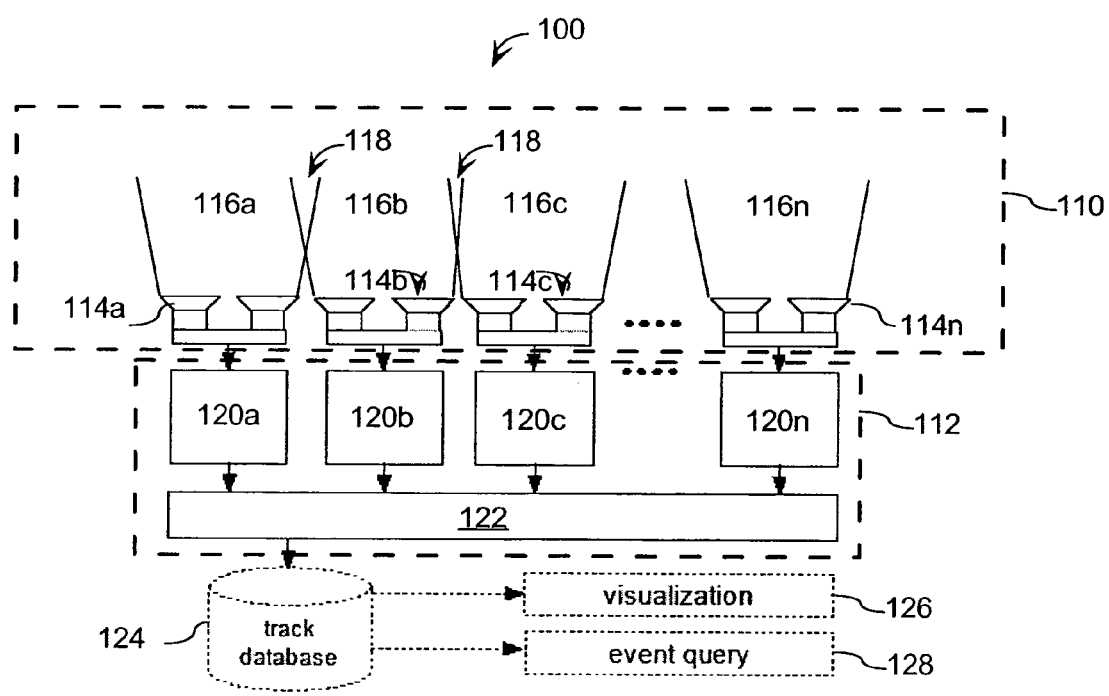
FIG. 1 is a block diagram illustrating an example of a system that may be used to track one or more movable objects over a wide area.

FIG. 1 is a block diagram illustrating an example of a system 100 that may be used to track one or more movable objects over a wide area. The system 100 may include a plurality or network of image sensors ("network") 110, each of which is communicatively coupled to logic 112.

Figure 2:
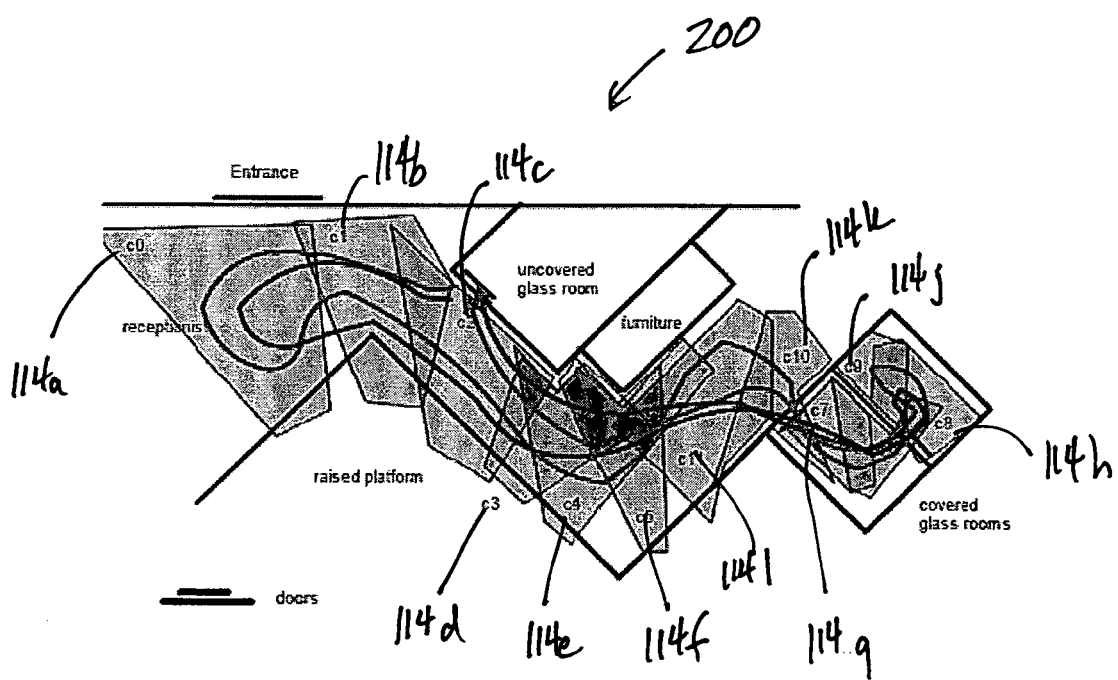
FIG. 2 is a diagram illustrating an overhead view of a floor of building, which is an example of a wide area.

The wide area may be an area covering, for example, a part of a floor of a building ("building floor") or any other area. FIG. 2 is a diagram illustrating an overhead view of a building floor 200. The building floor 200 includes two rooms and a large common area. The building floor 200 may include a number of challenges for tracking the movable objects. These challenges may include, for example, large TV displays with constantly changing appearance; the two rooms have IR-triggered lights installed that go on and off frequently; the two rooms have see-through glass walls; some of portions of the two rooms need to be monitored and others portions are excluded from being monitored; and the rooms have low ceilings (e.g., 2.7 m), which prevent the stereo sensors 114a-114n from having large tilt angles. Smaller tilt angles result in more severe/full occlusions towards a far side of the wide area.

Referring back to FIG. 1, the network 110 includes a first stereo sensor 114a, a second stereo sensor 114b, a third stereo sensor 114c and an nth-stereo sensor 114n (collectively "stereo sensors 114a-114n"). The stereo sensors 110a-110n, which may be embodied as stereo cameras, have associated field of views ("FOVs"), namely, FOVs 116a-116n. Being stereo, the stereo sensors 114a-114n are configured to provide not only two-dimensional ("2D") information, but also depth information (collectively "3D information") for images captured in their respective FOVs 116a-116n. The 3D information provided by stereo sensors 114a-114n advantageously allows for reliable discrimination of each of the objects in the wide area, even if the wide area is cluttered.

In addition, the stereo sensors 114a-114n may be arranged such that the FOVs 116a-116n of adjacent stereo sensors 114a-114n have overlaps 118 in their respective FOVs 116a-116n. The overlaps 118 may be minimized to provide the wide area with maximum coverage using a minimum amount of stereo sensors 114a-114n. As described in more detail below, the overlaps 118 beneficially allow for employment of space-time constraints to form global tracks.

Each of the stereo sensors 114a-114n may have lenses having any appropriate focal length, including for example focal lengths ranging from 3.6 mm to 6 mm. The stereo sensors may be installed at most any tilt angles, including for example, tilt angles of ranging from 17 to 33 degrees. Each of the stereo sensor 114a-114n may have most any baseline, include a baseline of roughly 10-15 cm.

Each of the stereo sensors 114a-114n may be calibrated for stereo computation, single-camera tracking and multi-sensor fusion, as discussed in more detail below. Radial distortion correction is performed. Each of the stereo sensors 114a-114n may be adapted to a plane-plus-parallax method for stereo computation. A second view of each of the stereo sensors 114a-114n may be aligned to a reference view by an affine transformation at a given virtual plane. This plane may be chosen so that it is farther away than all the interested regions of the collective FOVs 116a-116n. Image disparity may be computed in real-time using a direct method.

A projection matrix and 3D reconstruction (i.e., a transformation from image disparity to real 3D points) for each of the stereo sensors 114a-114n may be computed at the same time.

For example, a coordinate of an image point may be denoted as (u,v) and its disparity as d d. Then (u,v,1,d) may be a projective reconstruction of a corresponding 3D point (x,y, z,1) in a world. The image point and corresponding 3D point may be related by a 4×4 homographic transformation as $[x,y,z,1]^T \sim H \cdot [u,v,1,d]^T$.

The H matrix may be estimated and/or optimized directly from a set of 3D points and their correspondences in both views. This direct optimization avoids a potential error in estimating explicit camera parameters (e.g., rotations, translation, and baseline) used in depth computation by triangulation. Having H computed, the projection matrix for the stereo sensors 114a-114n acting as a reference is given by:

$$P = \begin{pmatrix} h_1^{-1} \\ h_2^{-1} \\ h_4^{-1} \end{pmatrix}$$

where $h_i^{-1}$ is the i-th row of $H^{-1}$.

The 3D points may be chosen for calibrating the stereo sensors 114a-114n in a common-world-coordinate system. As a result, each of the cameras 114a-114n may be calibrated with respect to a "same world," and as such facilitates multi-sensor fusion, as described in detail below.

The logic 112, which may be embodied in hardware and/or software, includes a multi-sensor-fusion module and a plurality of tracking modules, namely, a first tracking module 120a, a second tracking module 120b, a third tracking module 120c and an nth-tracking module 120n (collectively 'tracking modules 120a-120n); one for each of the stereo sensors 114a-114n. Although, more or less tracking modules may be used. The tracking modules 114a-114n, in turn, are communicatively coupled to the stereo sensors 114a-114n, respectively, and to the multi-sensor-fusion module 122.

The logic 112 may be a unitary device or be formed from one or more separate devices. In addition, the logic 112 may be concentrated on the common platform or distributed among a number of nodes.

As such, the tracking modules 120a-120n and the multi-sensor fusion module 122 may be co-located, integral to, integrated into or otherwise combined on one node. Alternatively, the tracking modules 120a-120n and the multi-sensor-fusion module 122 may be distributed across two or more different nodes, yet capable of exchanging information therebetween.

For example, the tracking modules 120a-120n may be co-located, integral to, integrated into or otherwise combined with the stereo sensors 114a-114n, respectively, but physically separate from multi-sensor-fusion module 122, yet may be in communication with both the stereo sensors 114a-114n and the multi-sensor-fusion module 122. Alternatively, the tracking modules 120a-120n may be co-located, integral to, integrated into or otherwise combined with the multi-sensor fusion module 116, but physically separate from the stereo sensors 114a-114n, yet in communication with both the multi-sensor-fusion module 122 and the stereo sensors 114a-114n, respectively.

Figure 3:
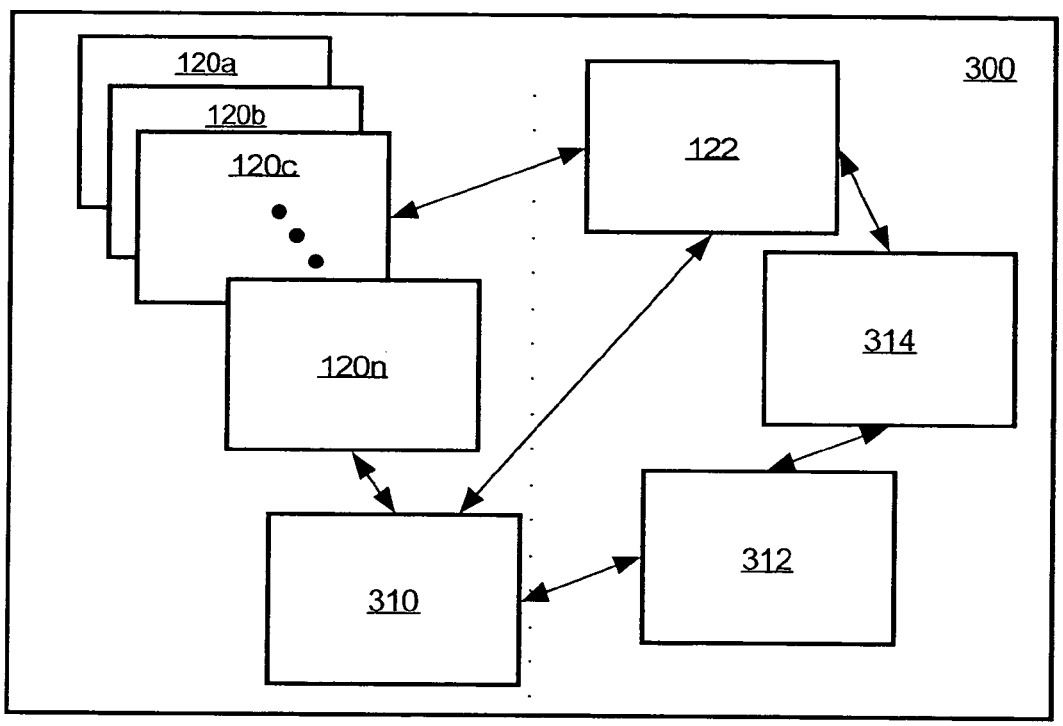
FIG. 3 is a block diagram illustrating an example of logic for performing the function described herein.

Referring now to FIG. 3, a block diagram illustrating an example of logic 300 for performing the function described herein, such as the logic 112, is shown. The logic 300, which may be embodied as a general or specialty purpose computer, includes a processor element 310, such as a central processing unit; a memory 312, such as a random access memory (RAM), a read only memory (ROM), an erasable programmable read only memory (EPROM) and variations thereof; flash memory, etc.; the tracking modules 120a-120n; the multi-sensor-fusion module 122; and one or more input/output (I/O) devices 314. These I/O devices 314 may be embodied as any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a user input device, including a keyboard, a keypad, a mouse and the like.

As noted, the logic 300 (and the elements thereof) may be implemented in software and/or in a combination of software and hardware, e.g., using application specific integrated circuits (ASICs), a general-purpose computer or any other hardware equivalents. As such, the logic 300 (and the elements thereof) may perform the functions described herein using the conventional processing techniques. For example, the tracking modules 120a-120n and/or the multi-sensor-fusion module 122 may be formed in software, which can be loaded into the memory 312 and executed by the processing element 310 to implement the functions as discussed herein. As such, any of the functions discussed herein (including processing associated data structures) can be stored, via one or more of the I/O devices 314, in a computer readable medium, carrier and/or store, including any of a RAM, magnetic memory, magnetic drive or diskette, optical memory drive or diskette and the like.

The logic 300 may, for example, be embodied as six personal computers employed operate as twelve of the tracker modules 120a-120n. Each of the personal computers may have a dual Pentium 4 2.8 G Hz CPUs and 512 MB memory. Each of the personal computers (acting as two of the tracker modules 120a-120n) processes input from 2 pairs of the stereo cameras 114a-114n, running distortion correction, stereo computation and tracking at an image rate of 15 Hz with video down-sampled to 160×120. Each of the personal computers can handle about 4 objects in for each of the 2 stereo sensors 114a-114n it services without any drops of images. The outputs from the personal computers may be sent to another PC through a local-area network LAN, which runs the multi-sensor-fusion module 122, a database 124 and event visualization 126.

Referring back to FIG. 1, the network 110, as shown, potentially includes an infinite amount (as indicated with the "nth" indication) of stereo sensors 114a-114n, and the logic 112, as shown, potentially includes an infinite amount of tracking modules 120a-120n. The network 110 and the logic 112 may include, however, less than an infinite amount of stereo sensors and tracking modules, respectively.

For convenience and simplicity, the following describes the network 110 in terms of first and second stereo sensors 114a, 114b, and the tracking modules 120a-120n in terms of first and second tracking modules 120a, 120b, which are communicatively coupled to the first and second stereo sensors 114a, 114b, respectively. As noted above, the tracking modules 120a, 120b (and the rest of the tracking modules), however, may be a single tracking module.

Example Operation

Figure 4:
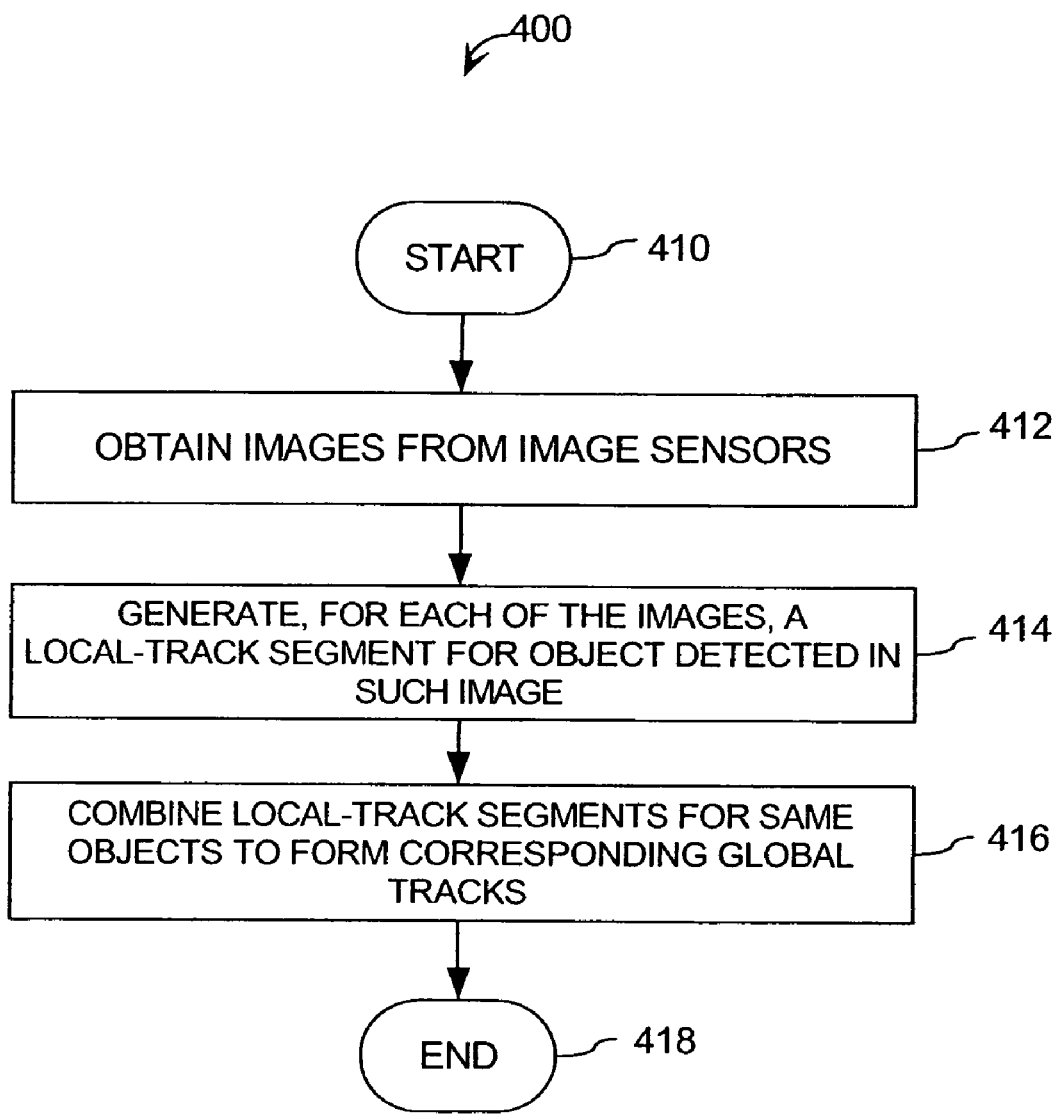
FIG. 4 is a flow diagram illustrating a method for tracking one or more movable objects over a wide area.

FIG. 4 is a flow diagram illustrating a method 400 for tracking one or more movable objects over a wide area. Although the method 400 may be carried out by different architectures, the following is described with reference to the example system 100 of FIG. 1, for simplicity.

The method 400 starts at termination block 410 after each of the first and second sensors 114a, 114b capture within their FOVs 112a, 112b at least one respective image. As shown in process block 412, each of the first and second tracking modules 120a, 120b obtain the first and second images from the first and second stereo sensors 114a, 114b, respectively. To obtain the images, the first and second tracking modules 120a, 120b may query and receive them from the first and second sensors 114a, 114b or, alternatively, receive them without querying.

After obtaining the first and second images, the first tracking module 120a generates first and second local-track segments for first and second objects captured in the first image, and the second tracking module generates third and fourth local-track segments for third and fourth objects captured in the second image, as shown in process block 414. To so generate, the first and second tracking modules 120a, 120b may use an object-representation process.

As described in more detail in the examples below (see Example Single-Camera Processing), the object-representation process allows the first and second tracking modules 120a, 120b to respectively discriminate the first object from the second object and the third object from the fourth object such that each of the first-fourth local-track segments uniquely identifies the object to which it is associated. To do this, the object-representation process may, for example, (i) characterize each of the first-fourth objects using a flexible, but discriminative, representation; and, for each representation, (ii) associate such representation to a ground plane. One example formulation of such object-representation process is a fast mode-seeking approach on a ground-plane projection of a portion (e.g., pixels) of a foreground of each of the images so as to provide, for each of the first-fourth objects, a corresponding representation of shape, appearance and ground-based depth.

The tracking modules 120a, 120b may generate the first-fourth local-track segments as a function of the corresponding representations. This function may be formulaically formed, for example, using a unified-mixture-model framework, and solved using an Expectation Maximization ("EM") algorithm. Using the EM algorithm, the tracking modules 120a, 120b iteratively estimate object ownerships and motion parameters for the corresponding representations to form the first-fourth local-track segments.

After generating the first-fourth local-track segments, the tracking modules 120a, 120b provide them the multi-sensor-fusion module 122. Assuming that the first and third objects and the second and fourth objects are the same objects, the multi-sensor-fusion module 122 may combine, resolve or otherwise process (i) the first and third local-track segments along with space/time constraints associated with the images provided by the first and second sensors 114a, 114b to form a first global track; and (ii) the second and fourth local-track segments along with the space/time constraints to form a second global track, as shown in process block 416.

The space/time constraints may be formed from ground-based, space-time cues. These ground-based, space-time cues are used to match the first-fourth local-track segments associated with the first and second objects as a function movement between the first and second sensors 114a, 114b.

The ground-based, space-time cues include object states, which, in turn, may include ground location and velocity of the first and second objects. The objects states may be modeled using a Gaussian variable, and estimated using a Kalman filter operated in forwards and/or backwards direction. The multi-sensor-fusion module 122 uses the object states for first-fourth local-track segments to match the first to the third local-track segment and the second to the fourth local-track segment. The multi-sensor-fusion module 122 may use the objects states to extrapolate movement of the first and second objects to stereo sensors 120c-120n of the network 100 that are not overlapping with the first and second sensors 120a, 12b.

As such, the first and second global tracks provide for handoffs of the first and second objects between the first and second sensors 114a, 114b (and the rest of the stereo sensors, if so captured in images thereof). Such handoffs result from the discrimination provided by the first-fourth representations and the space/time constraints, which collectively allow the first and second objects to be matched and carried across FOVs 112a, 112b.

At termination block 418, the method 400 terminates. Although in the foregoing method 400, the local-track segments are generated for only two objects, more or fewer local-track segments may be generated for more of fewer objects, respectively. In addition, the local-track segments may be combined to produce more or fewer global tracks. Moreover, the assumption that the first and second objects are the same objects captured in the images of the first and second stereo sensors is made only for illustration purposes, as one or both of the first and second objects captured in the images of the first and second stereo sensors may not be the same, respectively.

Example Single-Camera Processing

Figure 5:
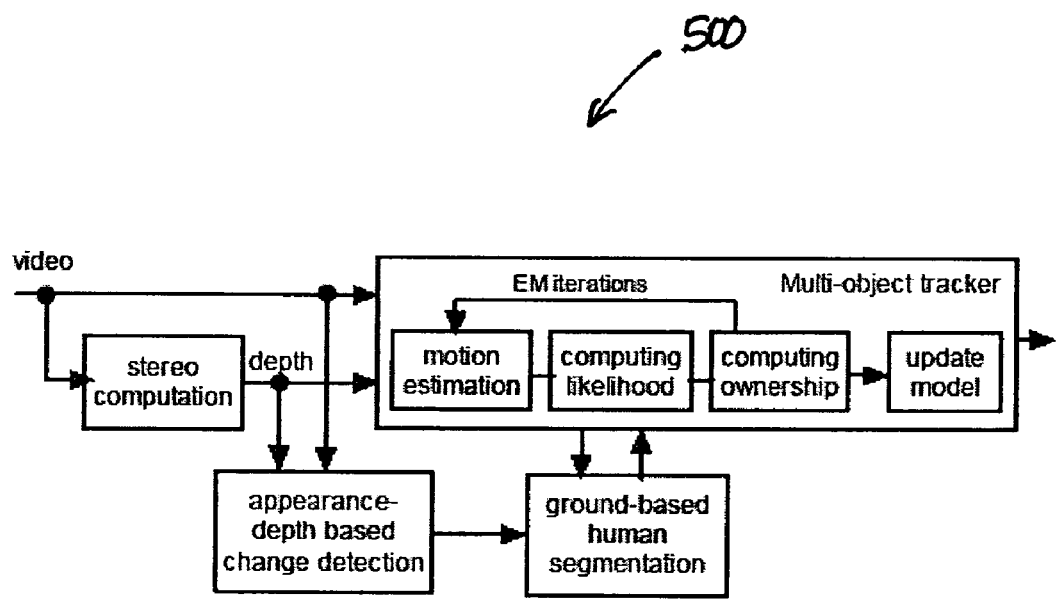
FIG. 5 is a block diagram illustrating an example of an object-representation process for a single stereo sensor.

FIG. 5 is a block diagram illustrating an example of an object-representation process 500 for a single stereo sensor, such as any of the stereo sensors 114a-114n. The object-representation process 500 may be performed by any appropriate architecture, such as a standard personal computer without special purpose hardware in real-time, near real-time or otherwise contemporaneous with receiving, images captured by the stereo sensors 114a-114n. For convenience, however, the object-representation process 500 process 500 is described with reference to the architecture 100 in FIG. 1, and in particular to stereo sensor 114a, the tracking module 120a and the multi-sensor-fusion module 122.

The stereo sensor 114a, the tracking module 120a, and the multi-sensor-fusion module 122 may use a layer-based formulation for tracking objects, such as humans. In this layer-based formation, the stereo sensor 114a and the tracking module 120a perform a semi-3D object representation for each object to be tracked ("tracked object"). For each tracked object, the semi-3D object representation encodes a ground position and uncertainty, 2D shape and appearance of each of such tracked objects.

Visually, each of these tracked objects can be thought of as a 2D cardboard cutout placed vertically on a ground plane, and each representation of the tracked objects can have a probabilistic shape and a part-based histogram appearance model. An advantage of using a ground-based representation of shape and appearance is that such ground-based representation of shape and appearance naturally provides invariance to image scale changes due to perspective effects. Further, appearance and depth models are generally resilient to pose variations and suitable for tracked object, which may be articulated.

The aforementioned representation, multi-object tracking, change detection, object instantiation and deletion approach for completeness are described in more detail below.

Object Representation

The tracking module 120a via the object-representation process 500 generates an object representation for each tracked objects captured in images obtained from the first stereo sensor 114a. These object representations richly and/or discriminatively formed so that each of the tracked objects can be distinguished from other of the tracked objects and the background. At the same time, each of the object representations is flexibly formed to take into account changes of properties of such tracked object over time.

Such rich, discriminate and flexible object representations may be formed by integrating multiple cues, such as position, shape, appearance and depth cues. By integrating such multiple cues ("integrated-object model"), the object-representation process provides robustness in crowded environments.

Figure 6:
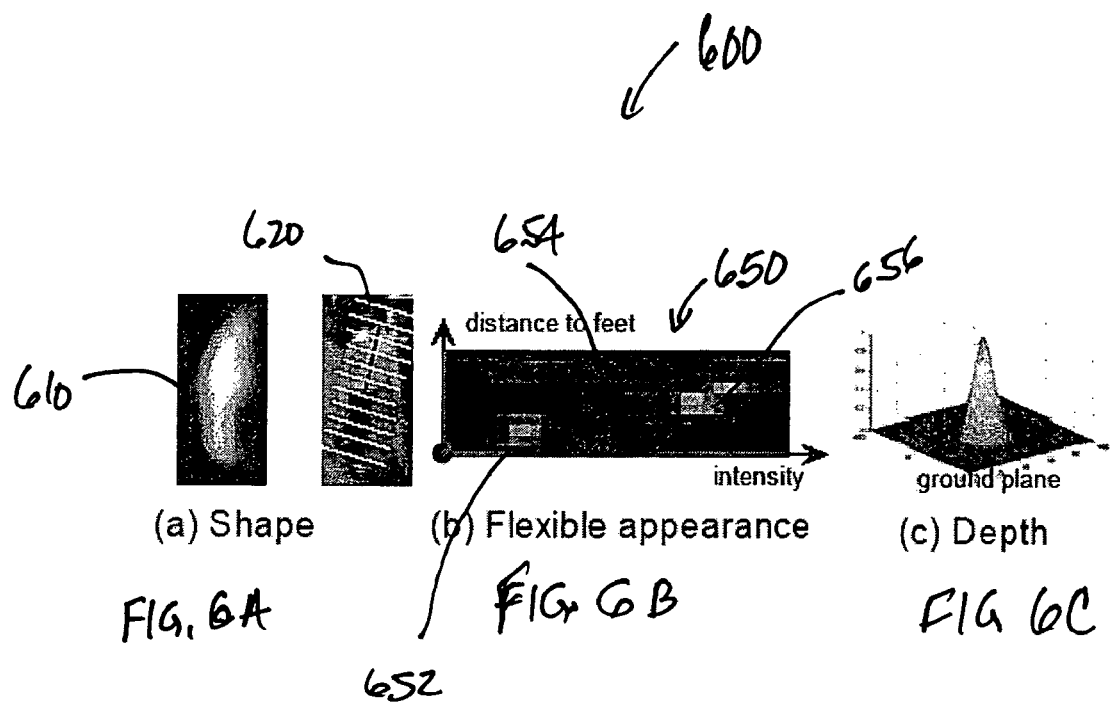
FIGS. 6A-6C are an image, a histogram and a graphical representation, respectively, of an example of an object representation formed from an object-representation process.

FIGS. 6A-6C are an image, a histogram and a graphical representation, respectively, of an example of an object representation 600 formed from an object-representation process, such as the object-representation process 500. The object representation 600 represents a human ("tracked human"); although, the object-representation 600 may represent any of the movable objects. In addition, the object-representation process 400 may generate an object representation for each of the tracked objects. While the object representation 600 of FIGS. 6A-6C is described with reference to the object-representation process 500 of FIG. 5 and the architecture 100, the object representation 600, however, may be generated by another object-representation process and/or architecture.

Shape Model

Referring to FIG. 6A, images illustrating an example of a cardboard cutout 610 and a cardboard grid 620 of the tracked human is shown. The tracking module 120a via the object-representation process 500 generates a non-parametric probabilistic-shape model. To do this, the tracking module 120a generates the cardboard cutout 610 into a human-size (percentage-wise) 2D rectangle cutout and partitions it into the 2D square grid of pixels (i.e., the cardboard grid 620). The cardboard grid 620 may be, for example, partitioned into 10 rows (along a height axis) and 3 columns (along a width axis).

The tracking module 120a may choose a size of the cardboard grid 620 such that one pixel of the cardboard grid 620 projects to roughly one pixel of the image on an average across an entire valid depth range of the cardboard cutout 610. The tracking module 120a associates an occupancy-probability value to each pixel of the cardboard grid 620 that represents a corresponding prior probability belonging to the tracked human. The tracking module 120a generates and defines as a shape model a set of occupancy probabilities of the cardboard grid 620. The shape model may be updated over time to reflect changes in pose of the tracked human.

Flexible Appearance Model

Referring back to FIG. 5, after generating and defining the non-parametric probabilistic-shape model for each of the tracked objects, the tracking module 120a may generate a part-based appearance representation. This part-based appearance representation may include generating adaptive and fixed image templates (or templates of filtered images) using global representations. These global representations tend to be resilient to sudden pose variations that may be from drift in a local-track segment when, for example, the tracked object (e.g., the tracked human) turns or performs non-rigid motion. The global representations also enforce spatial constraints, which tend to limit drift near occlusions and regions with similar statistics.

To facilitate generating the part-based appearance representation, the tracking module 120a may generate a color histogram of appearance for each pixel of the grid of the coarse-cardboard grid 620. This color histogram of appearance has at least two advantages. First, a non-parametric model, such as a histogram, is able to capture grid-level-appearance variation better than mere Gaussian models. While the Gaussian models may be adequate for rigid objects or objects with slow appearance/shape variation, however, the Gaussian models degrade rapidly while tracking highly-articulate objects, such as humans. Second, a coarse grid in the part-based appearance representation that employs a color histogram provides that small articulations do not significantly change in such histogram from one image to the next, and hence, tends to be more stable. The appearance representation may be updated over time to adapt to long-term pose and illumination variations.

Referring to FIG. 6B, a chart illustrating an example of a histogram 650 of a part-based appearance representation of a coarse-cardboard grid, such as the cardboard grid 620, of the tracked human is shown. For simplicity, the histogram 650 includes only a partition along a vertical dimension of the part-based appearance representation. Image intensity of part-based appearance representation is set forth along the x-axis of the histogram 650, and distance from foot of part-based appearance representation is set forth along the y-axis of the histogram 650. The histogram 650 clearly shows three distinct high-probability regions, namely a dark leg area 652, a bright torso area 654 and darker head area 656.

Ground-Based Depth Model

Referring back to FIG. 5, the tracking module 120a may use the depth information from stereo sensor 114a for distinguishing the tracked objects, which are separated in the world, but are seemingly not separated (e.g., are dose together) in images captured in 2D. As such, the tracking module 120a, for each of the tracked objects, may use ground-based-depth representation. The ground-based-depth representation beneficially allows for distinguishing vertically elongated objects that usually do not intersect on the ground, such as humans. To do this, the tracking module 120a may represent a ground location of each of the tracked objects using a Gaussian-random variable N($\mu$, $\Sigma$), where $\mu$ represents the center and $\Sigma$ encodes a ground spread of the tracked object; a fixed number over the ground plane; and a location-error variance, which varies inversely to a distance from the stereo sensor 114a. The ground spread serves to constrain a 3D spread of the tracked object. The ground-based-depth representation for each of the tracked objects may become an input to multi-sensor-fusion module 122 when all of the stereo sensors have a common ground definition.

Multi-Object Tracking

The tracking module 120a may perform multi-object tracking using a mixture-model estimation formulation. To do this, the tracking module 120a may model an image observation (e.g., appearance and depth) as a mixture model having a first component for each object layer, and a first component for a background layer.

$$P(I \mid M, \Psi, \Theta) = m^b P^b(I; \psi^b) + \sum_{l=1}^{n} m^l P^l(I; \psi^l, \theta^l) \quad (1)$$

where:

$M = \{m^b, m^1, m^2, \ldots, m^n\}$ is a set of mixing probabilities, which may be equivalent to the aforementioned object representations, (e.g., the non-parametric probabilistic-shape models), $\Psi = \{\psi^b, \psi^1, \ldots, \psi^n\}$ is a set of appearance and depth for each of the tracked objects, and $\Theta = \{\theta^1, \ldots, \theta^n\}$ is a set of motion parameters for each of the tracked objects.

The tracking module's 120a objective of computing equation ("Eqn.") 1 is to compute $\Lambda = \{M, \Psi, \Theta\}$ to maximize an observation likelihood.

For the tracking module 120a to track multiple of the tracked objects, the tracking module 120a may estimate $\Lambda_1, \ldots, \Lambda_t$ from input images in $I_1, \ldots I_t$ an online mode. To facilitate this, the tracking module 120a may perform this in two parts.

In the first part, the tracking module 120a assumes $M_t$ and $\Psi_t$ are known, and then estimates a motion parameter $\Theta_t$. Details of an example for estimating the motion parameter ("Estimating Motion parameters") are set forth below.

In the second part, the tracking module 120a estimates $M_k, k=1, \ldots, t$ and $\Psi_k, k=1, \ldots, t$ assuming $\Theta_k, k=1, \ldots, t$ is known. The tracking module 120a may perform this by solving the mixture-model estimation using an online version of the EM algorithm. Accordingly, the tracking module 120a may update shape and appearance models using infinite impulse response (IIR) filtering weighted by layer ownerships. The tracking module 120a may use Kalman filtering to update the depth model.

Estimating Motion Parameters

At each new image captured by the stereo sensor 114a, assuming the tracking module 120a knows the mixing probabilities $M_t$, and the object representation (e.g., the appearance and depth models) for each of the tracked objects, the tracking module 120a may estimate the motion parameters $\Theta_t$ by optimizing Eqn. 1.

The tracking module 120a may optimize Eqn. 1 using one of many different techniques, such as the particle filtering or the EM algorithm. The EM algorithm may be formulated ("EM formulation") to efficiently compute local maximums of the mixture model. According to the EM formulation, optimal motion parameters for each of the tracked object may be obtained by iteratively maximizing:

$$\Theta_t^{k=1} = \underset{\Theta_t}{\mathrm{argmax}} Q(\Theta_t, \Theta_t^k) \quad (2)$$

Where
$$Q(\Theta_t, \Theta_t^k) = \sum_{l=1}^{n} \log(w(m_{t-1}^l : \theta_t^l)) o_t^l(\Theta_t^k) + \quad (3)$$
$$\sum_{l=1}^{n} \log(p^l(I_t | \psi_t^l : \theta_t^l)) o_t^l(\Theta_t^k) + \log(m_t^b) o_t^b(\Theta_t^l) + \log(p_t^b(I_t | \psi^b)) o_l^b(\Theta_t^l)$$

where $p^l(I_t|\psi_t^l:\theta_t^l)$ is a joint appearance and depth likelihood of layer l, $w(\cdot)$ is a warping function, and $o_t^l(\Theta_t^k)$ are the ownership probabilities for layer at the EM iteration, and is given by:

$$o_t^l(\Theta_t^k) = \frac{m_t^l p^l(I_t | \Lambda_{t-1}, \Theta_t^k)}{p^l(I_t | \Lambda_{t-1}, \Theta_t^k)} \quad (4)$$

In equation ("Eqn.") 3, the first term is a matching cost between a latest shape model and expected ownership probabilities; the second term is a matching cost between a joint appearance and depth likelihood of the tracked object and expected ownerships. The rest of the Eqn. 3 reflects a background model. Maximizing these terms provides a best match between latest object models and observations.

The tracking module 120a may maximize Eqn. 3 for each of the tracked objects independently by searching an object translation in a small window around a predicted location. The iterations of the EM formulation may quickly converge to a correct solution. Two (2) iterations should be sufficient.

Figure 7:
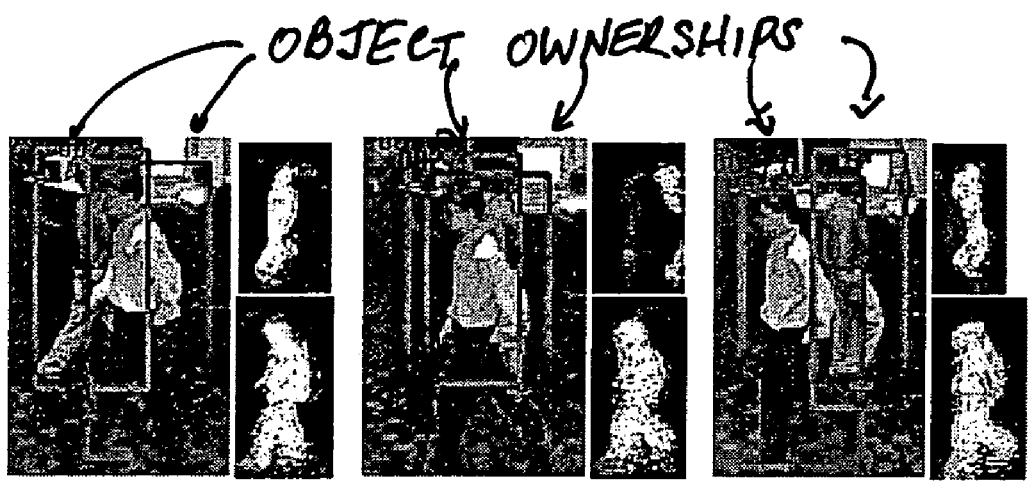
FIG. 7 is a group of images illustrating ownership of evolutions of two tracked objects when tracked through severe occlusion using an integrated object model.
Figures 8A, 8B, 8C, 8D:
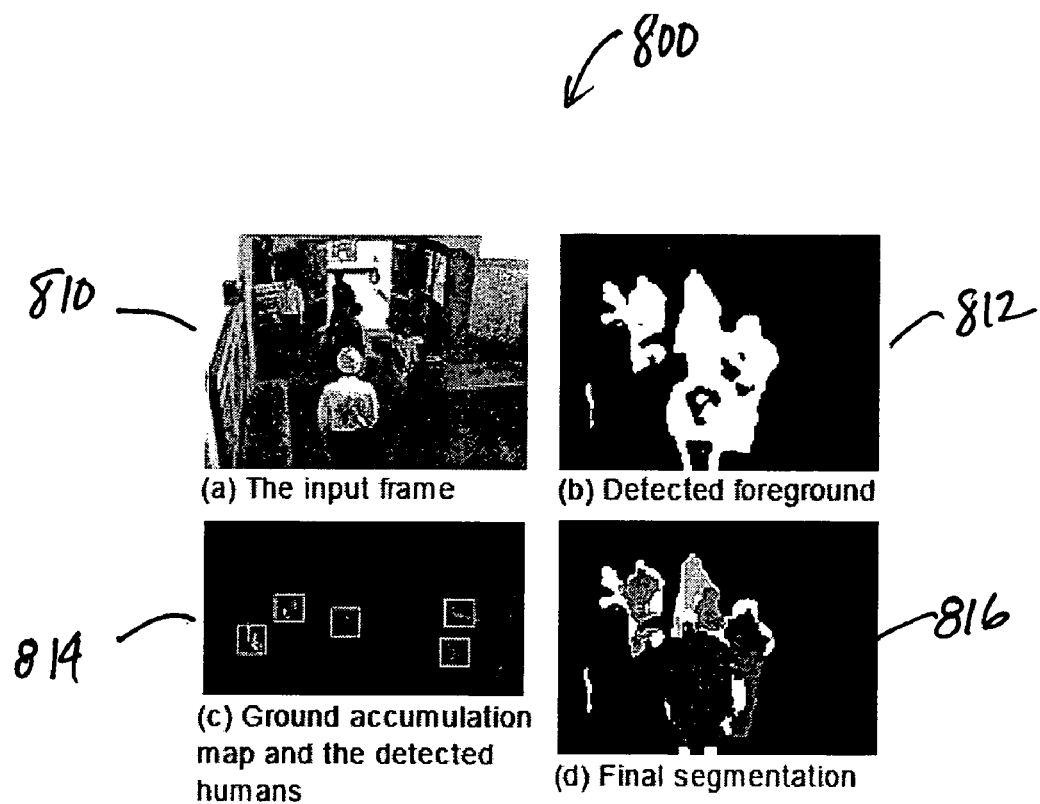
FIGS. 8A-8D are a group of images illustrating an application of a fast-object-segmentation technique.

FIG. 7 is a group of images illustrating ownership of evolutions of two tracked objects when tracked through severe occlusion using an integrated object model, such as the integrated-object model noted above. As can be seen, the integrated-object model may achieve almost perfect object ownerships.

Background Modeling and Change Detection

Referring back to FIG. 5, the tracking module 120a may build and update over time an integrated appearance and depth background model. To do this, for example, the tracking module 120a may build and update over time at each pixel a histogram-based-background model for both an appearance and a depth of the background ("background appearance" and "background depth," respectively). For background appearance, the tracking module 120a may use a filtered representation of the original image. For example, the tracking module 120a may use a Laplacian of the original image that provides some degree of invariance to illumination changes.

The integrated appearance and depth background model is generally insensitive to a change in illumination (e.g., a global change due to turning on/off light or to a shadow of the moving objects) or change in appearance of the background (e.g., due to large TV display). The tracking module 120a classifies pixels that are dissimilar to the background model as foreground.

Object Segmentation, Instantiation and Deletion

As noted above, the stereo sensors 114a-114n and generating ground plane-based representations of the tracked objects enables much better segmentation of the tracked objects, especially in a crowded environment, as compared to monocular sensors.

To take advantage of the stereo, the tracking module 120a may use a fast-object-segmentation technique, which is based on an efficient-mode-seeking algorithm (e.g., a mean shift) on a foreground-ground-accumulation map. The foreground-ground-accumulation map may constructed by projecting 3D points of the foreground onto a quantized ground grid.

To do this, for example, the tracking module 120a identifies as seed points local peaks on the foreground-ground-accumulation map for each of the tracked objects. For each of the tracked objects, the tracking module 120a may apply a few iterations of the efficient-mode-seeking algorithm starting from these seed points using a circular kernel whose size is approximately the size of the tracked object; for instance, a size of a human (e.g., 0.4 meters in radius). The modes resulting from the iterations ("resulting modes") are merged when their distance is smaller than half of the tracked object; for instance, a width of a human.

The tracking module 120a may apply, for each of the tracked objects, one or more thresholds on the foreground-ground-accumulation map (e.g., a number of image pixels that contribute to one of the resulting mode) to separate a true detection of the tracked object from any extraneous noise in one of the depth maps. Note, these thresholds may be different at different locations, and may be set according to an expected image size of each of the tracked objects according to geometry of the stereo sensor 114a. The tracking module 120a may perform the fast-object-segmentation technique faster than other techniques, such as those that need to form one or more convolutions of the kernel at every pixel location of the foreground-ground-accumulation map.

FIGS. 8A-8D are a group of images illustrating an application of a fast-object-segmentation technique 800, such as the fast-object-segmentation technique noted above. The first image 810 is an input image to the fast-object-segmentation technique 800; the second image 812 is an image showing foreground detected by the fast-object-segmentation technique 800; the third image 814 is an image showing a foreground-ground-accumulation map and tracked objects (i.e., humans) generated by the fast-object-segmentation technique 800; and the fourth image 816 is an image showing a final segmentation generated by the fast-object-segmentation technique 800.

As readily discerned from the first-fourth images 810-816, the fast-object-segmentation technique 800 is very powerful for segmenting multiple, very close-by humans. Note that the noise in the second image 812 due to stereo artifacts and shadow have been successfully excluded from the final segmentation shown in the fourth image 816. Another advantage of the ground-based segmentation is that a user can easily specify which part of a scene is to be monitored.

Referring back to FIG. 5, in each image after the tracking process, the tracking module 120a may invoke a matching process between the tracked objects and detected objects (i.e., between the tracked objects and the objects that are not matched with objects used to instantiate a new object for tracking).

The tracking module 120a may use the detected objects to reset a state and representation of its corresponding tracked object opportunistically to avoid drifting. The tracking module 120a may delete the detected objects whenever such objects exit from a monitored area as specified by the user in, for example, ground coordinates.

Multiple Camera Fusion

The multi-sensor-fusion module 122 may receive the local-track segments and their associated features from one or more of the tracking modules 120a-120n. A goal of the multi-sensor-fusion module 122 is to associate or combine the local-track-segments generated by tracking modules 120a-120n for each of the tracked objects, and assign a global track (e.g., a global identifier) to each combination.

In an online mode, the local-track segments are continuously fed to the multi-sensor-fusion module 122. As such, the multi-sensor-fusion module 122 associates the incoming local-track segments to one of the tracked objects or a new tracked object. Due to the noisy input information and the ambiguity of the incoming local-track segments, the multi-sensor-fusion module 122 may make delayed decisions. These decisions may become fixed and/or resolved only after some time after the incoming local-track segments have begun. The multi-sensor-fusion module 122 may chose the delay to be 1 or 2 seconds or other time that is above an average time for the tracked objects to cross the overlap of two of the neighboring stereo sensors 114a-114n.

At a given time instant, the multi-sensor-fusion module 122 may assume that n objects $\{O_{k_i}, \ldots, O_{kn}\}$ where $k_i$ a global track of $O_{k_i}$. The multi-sensor-fusion module 122 may use a special ID $k_o$ to denote a virtual new object. The multi-sensor-fusion module 122 may also assume m unresolved tracks $\{T_1, \ldots, T_m\}$. The multi-sensor-fusion module 122 may compute an optimal global ID $d_i \in \{k_0, k_1, \ldots, k_n\}$ for each track $T_i$. Unlike in the case of non-overlapped stereo sensor 114a-114n, the global tracks of different tracks are not exclusive, i.e., the multi-sensor-fusion module 122 may compute multiple unresolved local-track segments that have the same global track. This typically excludes the possibility of applying some efficient graph matching algorithm. Due to the large number $((n=1)^m)$ of possibilities of considering the local-track segments together, the multi-sensor-fusion module 122 may compute the optimal global tracks for each of the local-track segments independently as the following (note: the index of the track $T_i$ is dropped):

$$d^* = \arg_{d_i \in \{k_0, k_i, \ldots, k_n\}} \max P(d | O_d, T) \quad (5)$$

Assuming a uniform prior on d:

$$P(d | O_d, T) \sim P(T | d, O_d) = \begin{cases} L(T | d, O_d) & \text{if } d \neq k_o \\ L_e(T) & \text{if } d = k_o \end{cases} \quad (6)$$

where $L(T|d,O_d)$ is a likelihood of local-track segments T matching of tracked object $O_d$, and $L_e(T)$ is a likelihood of local-track segments T being a start of a new tracked object, both according to some features.

After the multi-sensor-fusion module 122 resolves the local-tracks segments for each of the tracked objects, the multi-sensor-fusion module 122 adds such local-track segments to such object and uses it to update its features.

Association Using Space-Time Cues

The multi-sensor-fusion module 122 may use, for each of the tracked objects, space and/or time cues to measure location and velocity matches of two of the local-track segments. Since the stereo sensors 114a-114n have overlap 118, when a tracked object (e.g., a human) moves from one of the stereo sensors 114a-114n to a neighboring one of the stereo sensors 114a-114n, the tracked objects may appear (at some instant in time) in FOVs 116a-116n. Accordingly, ground locations and velocities measured from the two FOVs 116a-116n may be the same because the FOVs 116a-116n may be set to being view-independent entities.

The ground locations and velocities can be measured more accurately using stereo cameras than using monocular cameras, which usually rely on feet localization). As such, the ground locations and velocities serve as a relatively tight constraint. The multi-sensor-fusion module 122 may model a state (e.g., a location and/or a velocity state) of an object using a Gaussian random variable, and then perform probabilistic analysis to account for the difficulties, such as difficulties from measurement noise and possible temporal gaps between the local-tracks segments. The multi-sensor-fusion module 122 may also make decisions on the observations of multiple images to increase robustness.

Trajectory Estimation

The multi-sensor-fusion module 122 may filter the local-track segments using a Kalman filter, which may assume a constant-velocity-dynamic model, to provide filtered states. The filtering provided by the Kalman filter not only reduces a noise level in the measurements, but also provides velocity estimates both for matching two non-overlapping local-track segments and separate feature association.

By making delayed decisions, the multi-sensor-fusion module 122 provides the luxury of getting better velocity estimates using forward-backward filtering (e.g., a Kalman smoother). The forward-backward filtering avoids an inherent lag of an online filter (e.g., a regular forward filter) by combining information from the future measurements. Then each of the filtered states is denoted as:

$$x = [x, y, \dot{x}, \dot{y}]^T$$

where (x,y) is the location and $(\dot{x}, \dot{y})$ is the velocity. Each of the filtered state is a Gaussian random variable. Besides the estimates at the sample times, the best linear estimate of each of the filtered states at any time can also be computed using the Kalman filter. The best estimate of the state $T^{(t)}$ of track T at time t.

Matching Overlapping Tracks

If the local-track segments T have temporal overlap with an object $O=\{T_1, \ldots, T_n\}$ ($T_i$ is the i-th track segment belong to O) the multi-sensor-fusion module 122 may match the local-track segments T to all the local-tracks segments $T_i$ for the tracked objects that have overlap with in time. The multi-sensor-fusion module 122 may then integrate the results. When T is matched to the local-track segments $T_i$, the multi-sensor-fusion module 122 may compute an association likelihood by a similarity of the states of all the time samples of T and the state estimates of $T_i$ at the same time samples during the overlapped interval. The matching at all such time samples is highly correlated, the multi-sensor-fusion module 122 may combine the results by simple averaging.

The similarity of two Gaussian state variables is defined to be their normalized correlation. The normalized correlation $NC(x_1,x_2)$ of two Gaussian random variables $x_1=N(\mu_1,\Sigma_1)$ and $x_2=N(\mu_2,\Sigma_2)$ has the following analytical form $$NC(x_1, x_2) = \frac{\sqrt{2|\Sigma|}}{(|\Sigma_1||\Sigma_2|)^{\frac{1}{4}}} \exp\left\{-\frac{\mu_1^T \Sigma_1 \mu_1 + \mu_2^T \Sigma_2 \mu_2 - \mu^T \Sigma \mu}{2}\right\} \quad (7)$$

where $\Sigma=(\Sigma_1^{-1}+\Sigma_1^{-1})^{-1}$; and $\mu=\Sigma(\Sigma_1^{-1}\mu_1+\Sigma_2^{-1}\mu_2)$. This normalized correlation is better than a simple likelihood evaluation from a Normal distribution because it considers both two distributions.

More specifically, the multi-sensor-fusion module 122 may compute $L(T|d,O_d)$ as follows. For each of the local-track segments $T_i \in O_d$, the multi-sensor-fusion module 122 may compute a set of time samples $S_i=\{t,|tj \in TS(T), t_j \leq e(T_i)\}$ where $TS(\cdot)$ is a set of all time samples of the local-track segments, $s(\cdot)$ and $e(\cdot)$ are starting and ending time of a the local-track segment.

$$L(T|d, O_d) = \frac{1}{|\Sigma_i||S_i|} \sum_{T_i \in O_d} L(T|T_i) \quad (8)$$

$$= \frac{1}{|\Sigma_i||S_i|} \sum_{T_i \in O_d} \sum_{t_i \in S_i} NC(T^{(tj)}, T_i^{(tj)})$$

where $T_i^{(tj)}$ is a state estimation on $T_i$ at a time sample of T. Such estimation supports fully asynchronous stereo sensors 114a-114n, when the stereo sensors 114a-114n drop images and when the stereo sensors 114a-114n work at different rates of delivery of the images.

Matching Non-Overlapping Tracks

Even when stereo sensors 114a-114n have the overlap 118, the local-track segments of the tracked objects (e.g., humans) may have slight gap due to the missing of depth at an image boundary or a late instantiation. Motion of the tracked objects usually show a good continuation during small gaps, therefore, the multi-sensor-fusion module 122 may still use space and/or time cues (noted above) for associating non-overlapped local-tracks segments. Large gaps may be handled differently.

If T does not overlap any of the local-track segments in $O_d$, the multi-sensor-fusion module 122 may choose $T_i \in O_d$, which has a latest ending time for matching. If $e(T_i)$ and $s(T)$ are within $\delta T$ ($\delta T$ may be set to 1 or 2 seconds), the multi-sensor-fusion module 122 may compute the $T_i^{(s(T))}$, the best state estimate of $T_i$ at time $s(T)$, and $T_i^{(e(t))}$, the best state estimate of T at time $e(T_i)$, using Kalman prediction and back-prediction respectively.

$$L(T|d, O_d) = L(T|T_i) \quad (9)$$

$$= \frac{NC\left(T^{(e(T_i))}, T_i^{(e(T_i))}\right) + NC(T^{(s(T))}, T_i^{(s(T))})}{2}$$

Due to the fact that the covariances of the predicted locations are larger than the estimation from measurements, the matching score decreases as the gap increases.

Figures 9A, 9B:
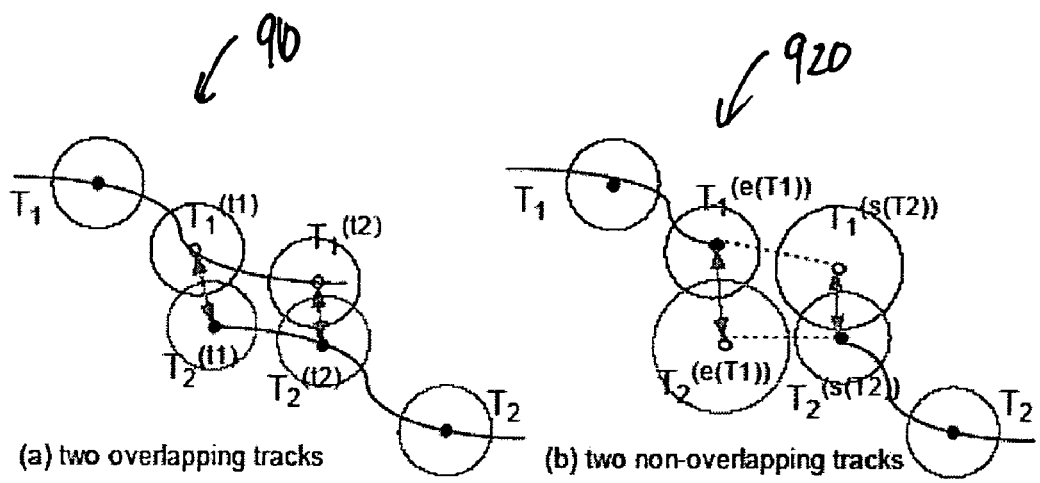
FIGS. 9A-9B are block diagrams illustrating first and second results generated from using space and/or time cues to match two local-track segments from overlapping and non-overlapping stereo sensors, respectively.

FIGS. 9A-9B are block diagrams illustrating first and second results 910, 920 generated from using space and/or time cues to match two local-track segments from overlapping and non-overlapping stereo sensors, respectively. The first results 910 include a matching of two local-track segments $t_1$ and $t_2$ on $T_2$ that have overlap with $T_1$ (more local track segments may be used if available). The second results 920 include a matching of two local-track segments, namely local-track segments $e(T_1)$ and $s(T_2)$, at the ending time $T_1$ and the starting time $T_2$, respectively. The dots show an estimated mean, and the circles denote covariances. Each of the states includes both location and velocity, however, only location is shown.

Matching with New Objects

The multi-sensor-fusion module 122 evaluates a likelihood of the local-track segments being the start of a new tracked object (i.e., $L_e(T)$) according to the knowledge of entrances of the environment. Locations of the entrances are well defined; usually in a preferred direction for each entrance. The location and velocity of the start of the new tracked object may be modeled as a mixture distribution:

$$Pe(x) = \sum_{i=1}^{n_e} l_i N\left(\mu_i, \sum_i\right) + l_o U(\Omega) \quad (10)$$

where $\mu_i$ is the mean location/velocity of the entrance, $\Sigma_i$ is an associated uncertainty, and $l_i$ reflects how often an entrance is used. A uniform component defined on the entire domain $\Omega$ captures other possibilities. The parameters may be hand crafted, but can also be easily learned from observations.

The multi-sensor-fusion module 122 may match the starting state $T^{(s(T))}$ of the local-track segments with the entrance distribution by combining the normalized correlation with each component in the mixture model using the component ownerships.

FIGS. 10A-10C are images illustrating respective result sequences 1010, 1012, 1014 from single-sensor tracking for a given monitored area. The result sequence 1010 includes segmented and tracked humans in a group of humans moving closely together. The result sequences 1012, 1014 both include tracked multi-human interleaving involving many severe occlusions.

The combined appearance and depth based background model is insensitive to the undesired changes mentioned above. The given monitored area is fully controlled by user-defined ground-based ROI, for example, the activity in the glass room viewed in stereo sensor 114b (FIG. 2) is not tracked. The tracking modules 120a-120n are able to promptly segment and accurately track multiple people moving closely together in a group (FIG. 10A), and multiple people passing by each other resulting in severe and/or full occlusion (FIGS. 10B, 10C).

FIG. 11 is a block diagram illustrating a multiple sensor fusion result 1100 for a given monitored area, such as discussed above. The multiple sensor fusion result 1100 includes two people traversing the entire given monitored area following each other with about 2-meter distance. The multiple sensor fusion result 1100 also includes a number of image chips of the first person captured by each of the stereo sensors 114a-114n. As shown by the multiple sensor fusion result 1100, the multi-sensor-fusion module 122 may handoff the tracked objects from one of the stereo sensors 114a-114n to another fairly reliably, including handing off into the rooms.

Evaluation of the Overall System

The system 100 may use the following two metrics together to characterize its performance. The first is track fragmentation, which is a rate defined as (number of global track breaks)/(number of local tracks). Exiting and reentering the covered area is not counted as a break. The second is track confusion, which is defined as (number of global track confusions)/(number of local tracks).

These metrics are designed for overall system performance to reduce two kinds of errors, which can occur when local-track segments are resolved. "Fragmentation" means that one of the local-track segments generated by existing objects starts a new object; "confusion" means that one of the local-track segments is associated to one of the tracked object that it does not belong to. These two errors may be handles as tradeoffs. The tradeoffs are designed to minimize or eliminate two extreme cases, namely, where 1) all the local-track segments correspond to different ones of the tracked objects; and 2) all local-track segments correspond to a single one of the tracked objects. IN addition, the errors in single-sensor tracking also reduce to one of the two errors.

CONCLUSION

The foregoing presented a fully integrated real-time computer vision system that is able to continuously monitor object movement (e.g., human activities) or otherwise track objects (including humans) in a large complex environment covered by a network of stereo sensors. The system can advantageously detect and track multiple humans promptly and accurately in very challenging real-life situations of groups of people moving in cluttered environments. The system is able to maintain object identities across the network using multi-sensor fusion. This multi-sensor fusion enables more interesting human behaviors analysis in large spatial and temporal domains. The foregoing assumes that multiple hypotheses to avoid the local minimum of the EM algorithm, and an efficient algorithm for joint identity assignment and other features (e.g., appearance, height) for association, are possible.

While the foregoing is directed to examples of the present invention, other and further embodiments of the invention may be devised without departing from the basic scope thereof, and the scope thereof is determined by the claims that follow.

What is claimed is:

1. A method for tracking objects over a wide area, the method comprising:

using a processor to generate a plurality of sets of local-track segments, wherein the plurality of sets of local-track segments respectively correspond to a plurality of objects captured in images taken by a respective plurality of stereo sensors, wherein generating each of the plurality of sets of local-track segments is based on generating, for each of the plurality of objects, a non-parametric probabilistic-shape model for such object;

generating, for each of the plurality of objects, a part-based appearance representation for such object, wherein the part-based appearance representation includes generating adaptive and fixed image templates using global representations;

generating, for each of the plurality of objects, a ground-based-depth representation for such object; and iteratively estimating ownership and motion parameters of each of the non-parametric probabilistic-shape model, the part-based appearance representation, and the ground-based-depth representation using an Expectation Maximalization algorithm; and designating at least one of the plurality of objects as a designated set of objects;

combining, for each of the designated objects, its set of local-track segments along with space and time constraints to form a designated global track, wherein the space and time constraints are formed from ground-based, space-time cues.

2. The method of claim 1 wherein generating from each of the images the plurality of sets of local-track segments comprises using an object-representation process on each of the images to detect the plurality of objects and to form the plurality of sets of local-track segments.

3. The method of claim 2, wherein using an object-representation process on each of the images comprises integrating multiple cues of the plurality of objects.

4. The method of claim 3, wherein integrating multiple cues of the plurality of objects comprises integrating, for each of the plurality of objects, position, shape, appearance and depth cues of such object.

5. The method of claim 1, wherein generating, for each of the plurality objects, a part-based appearance representation comprises generating, for each of the plurality of objects, a color histogram of appearance.

6. The method of claim 1, wherein generating from each of the images the plurality of sets of local-track segments comprises: using fast-object segmentation to differentiate each of the objects from another so that the corresponding set of local-track segments are associated with each of the plurality of objects.

7. The method of claim 6, wherein using fast-object segmentation to differentiate each of the objects comprises using an efficient-mode-seeking algorithm on a foreground-ground-accumulation map one each of the images.

8. The method of claim 1, wherein obtaining a plurality of sets of local-track segments, designating at least one of the plurality of objects, and combining, for each of the designated objects, its set of local-track segments to form a designated global track are performed in real-time, near real-time or otherwise contemporaneous with obtaining the images captured by the plurality of stereo sensors.

9. The method of claim 1, wherein the space and time constraints comprise object states selected from the group of objects states consisting of ground location and ground velocity.

10. The method of claim 1, wherein the space and time constraints comprise object states, and further comprising: modeling the object states using a Gaussian variable, and estimated the object states using a Kalman filter operated in any of a forwards and/or backwards direction.

* * * * *